United States Patent [19]

Buzzi

[11] 4,445,372

[45] May 1, 1984

[54] BALANCING MACHINE FOR BODIES OF ROTATION

[76] Inventor: Carlo Buzzi, Via Risorgimento, Mandello del Lario (Province of Como), Italy

[21] Appl. No.: 347,212

[22] Filed: Feb. 9, 1982

[51] Int. Cl.$^3$ ............................................. G01M 1/16
[52] U.S. Cl. ........................................ 73/459; 73/462; 73/473
[58] Field of Search ................. 73/462, 464, 471–473, 73/475–477, 459

[56] References Cited

U.S. PATENT DOCUMENTS 2,108,624  2/1938  Thearle ................................. 73/464
3,910,121  10/1975  Curchod et al. ..................... 73/462
3,924,473  12/1975  Maus .................................... 73/471

FOREIGN PATENT DOCUMENTS 1180865  1/1959  France ................................. 73/462

Primary Examiner—James J. Gill
Attorney, Agent, or Firm—Guido Modiano; Albert Josif

[57] ABSTRACT

The balancing machine comprises a rotation shaft whereon the body to be balanced can be mounted, a supporting structure for the shaft, and a carrying member for the supporting structure, in the form of a resiliently flexible plate. Detector means are provided for detecting the vibration generated by the unbalance of the body to be balanced and transferred thereto through the resilient plate, and means for imparting rotation to the shaft.

10 Claims, 6 Drawing Figures

BALANCING MACHINE FOR BODIES OF ROTATION

BACKGROUND OF THE INVENTION

This invention relates to a balancing machine for bodies of rotation.

On balancing machines, the unbalance of rotating bodies, hereinafter simply referred to as "rotaries", to be balanced is determined by measuring either the amplitude of the vibration of the stand or holder on which the rotary is mounted or the magnitude of the force opposing the stand vibration. In the former case, the balancer is of the so-called overcritical type, wherein the balancing measurements are taken at significantly higher rotational speeds than the system's proper frequency, the system including both the rotating body and the oscillating stand. In the latter case, the balancer is of the subcritical type, wherein the measurements are taken at much lower rotational speeds than the proper frequency. In both cases, the stand or holder must have a well defined elasticity range, as well as serve its main function of supporting the rotary under test.

The essential importance of the stand or holder of balancing machines has led to the provision of quite a number of constructional modifications. Thus, for example, European published patent application No. 0010785 discloses a balancer machine with plate like stand, wherein the plate stand is set perpendicular to the rotation axis of the body to be balanced. In order to increase the elasticity of the stand, extensive slots are provided therein which follow the plate outline. This type of stand is not suited to withstand the axial stress normally occurring during the machine operation. It, therefore, becomes necessary to provide stiffening means in the laminar stand. However, the stiffening means reduce the plate elasticity, which is instead an essential requirement for transferring the vibration to the vibration sensing or detecting members.

The said axial stress is a common occurrence, for example, when the body to be balanced happens to be a fan rotor or impeller the rotation whereof would apply an axially directed thrust force to the rotating support shaft. Axial stress forces are also experienced in handling the bodies to be balanced, and the plate must be capable of withstanding them. However, since the cantilevered machine shaft intended to carry the body to be balanced is subjected to a moment created by the weight of the body to be balanced, which moment would act on a plane containing the shaft axis, the plate which extends perpendicularly to said axis, undergoes a bending moment in a perpendicular direction to the plate plane, which bending moment adversely affects the vibration sensor operation.

With this type of conventional balancing machine equipped with a laminar stand which extends perpendicularly to the axis of the machine shaft, it has been found expedient to transfer the laminar stand vibration to the vibration sensing members remotely from the point where the shaft is associated with the support. This required unavoidably a weakening of the plate through the application of extensive slots which made the plate construction excessively delicate and raised the manufacturing costs thereof.

SUMMARY OF THE INVENTION

The Applicant has now found that the cited prior drawbacks can be obviated with a balancing machine having a resilient laminar stand having the characteristics recited in the appended claims.

The stand according to this invention has a particularly simple construction which combines the necessary strength for supporting the rotary with a suitable elasticity for measurements in the subcritical range and a substantial simplification in separating static from dynamic unbalance.

The stand of this invention is particularly useful for application on balancers which include a rotating shaft whereon rotaries in the form of either disks or wheels are mountd, and is specially suited for vehicle wheel balancing applications.

In such cases, according to the invention, the rotating shaft would be carried on bearings accommodated within a sleeve which is supported by a plate, the plate extending in the same plane as the rotation axis and being allowed to oscillate transverse to the rotation axis and torsionally pivot about its centroid axis, perpendicular to the rotation axis.

It is not strictly necessary that the transducers be arranged with their axes exactly orthogonal to each other, or respectively parallel and orthogonal to the rotation axis. In fact, it is possible to sum up, through simple and well known electric means (such as a resistive circuit), the signal from one transducer and part of the signal from the other transducer. With a suitable setting of the summed quantities, it would be a simple matter to obtain for each case electric signals which are proportional to the components orthogonal to the rotation axis.

BRIEF DESCRIPTION OF THE DRAWINGS

Some preferred, but not limitative embodiments of the invention are illustrated in FIGS. 1, 2, 3, 4 5, and 6 of the accompanying drawing.

DESCRIPTION OF THE PREFERRED EMBODIMENTS

Figure 1:
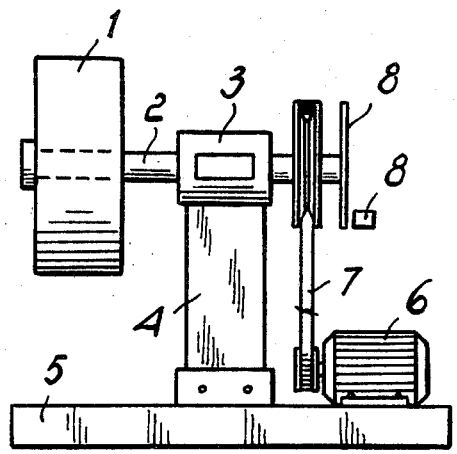
FIG. 1 is a general side view of the machine.

With reference to the drawing, there is shown in FIG. 1 a balancer where a rotary body to be balanced, such as a wheel 1, is mounted on a spindle or auxiliary shaft 2 carried by suitable bearings which are installed within a sleeve 3 supported on a resilient plate 4 which is in turn secured to the machine bed or stand member 5. The rotational movement of the shaft is provided by an electric motor 6 through a belt drive 7. FIG. 1 also shows diagramatically a phase detector 8, which may be of any conventional type.

Figure 3:
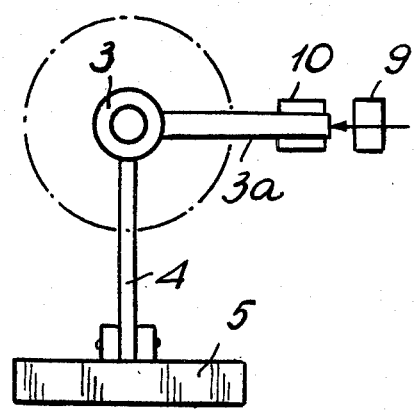
FIG. 3 is a front view of the stand.
Figure 2:
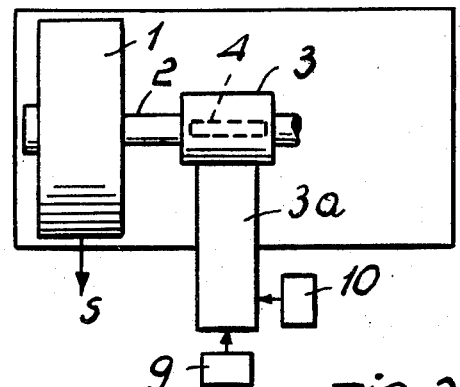
FIG. 2 is a plan view of the stand.

FIG. 2 is a plan view of the stand of FIG. 1, said support being viewed frontally in FIG. 3.

In FIGS. 2 and 3, indicated at 9 and 10 are vibration or force detectors, which may be of any conventional type, e.g. piezoelectric.

Figure 6:
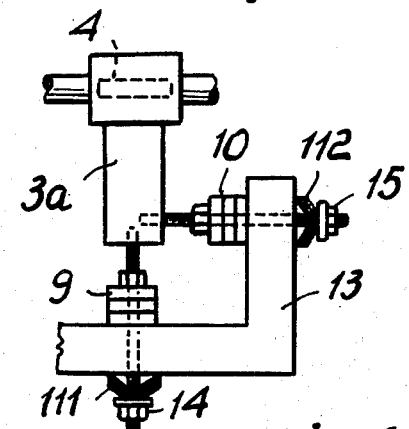
FIG. 6 is a plan view of the stand illustrating the transducer fastening method.

In order for the stand 3a,4 to be at all times held closely adjacent the two transducers 9 and 10, so that the latter are enabled to constantly detect the stand movements and forces acting thereon, initial stresses shall expediently have to be created, as shown for instance in FIG. 6, where 9 and 10 designate the transducers, of the piezoelectric type, which are securely clamped against the stationary portion 13, which is a part of the machine load bearing structure, by means of springs 111 and 112 which are tensioned through nuts 14 and 15.

The plate 4 carries the support 3 with the shaft 2 and rotary 1, the plate providing high rigidity in the vertical and longitudinal directions. Rigidly connected thereto, through the support 3, is an arm 3a which serves the function of transferring the vibration of the plate 4 to vibration and force detectors 9 and 10.

The machine operates as follows. After mounting a rotary body 1 to be balanced on the shaft 2, the motor 6 is energized which drives the shaft 2 rotatively. Through the influence of an unbalance centrifugal force S (FIG. 2) applied through the centroid of the rotary 1, the plate 4 will tend to deflect in a transverse direction to the axis of the auxiliary shaft 2, thus loading the detector 9 adapted for measuring the rotary static unbalance. At the same time, the plate tends to twist itself and load the detector 10.

Figure 4:
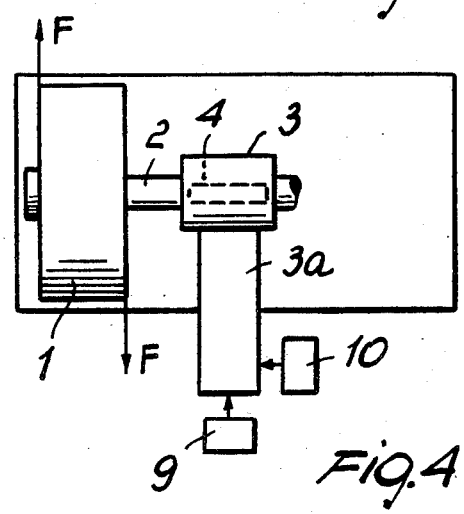
FIG. 4 is a view similar to FIG. 2, wherein the arrows indicate the action of a purely dynamic unbalance.

Under the influence of a purely dynamic unbalance of the rotary (FIG. 4), the two equal forces F will generate a couple, transferred to the plate 4, which will tend to twist upon itself, thus loading the detector 10. Accordingly, the detector 10 is adapted to provide a signal which is mainly dependent on the dynamic unbalance of the rotary, whereas the detector 9 supplies a signal dependent on the static unbalance thereof.

Conventional signal processing circuits for processing these signals as well as those from the phase detector 8, will display on a suitable instrumentation the unbalance values related to the two planes of correction of the rotary.

It should be noted that in accordance with the terminology of this specific art, "static unbalance" refers to those unbalance situations which can also be detected in a static condition, whereas the expression "purely dynamic unbalance" refers to those unbalance situations which can only be detected in a dynamic condition.

Figure 5:
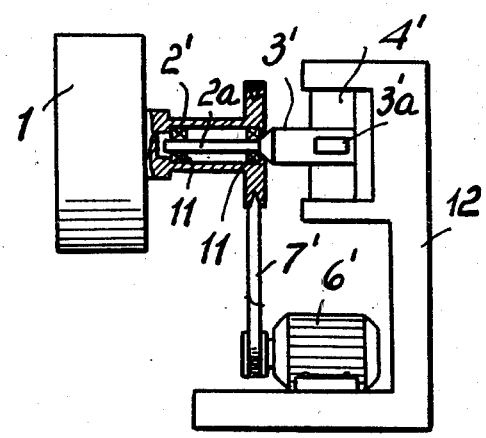
FIG. 5 is a side view of a modified embodiment incorporating a stand with a non-rotating spindle.

FIG. 5 illustrates a further possible embodiment of the invention, wherein equivalent parts to the former embodiment have been designated with the same reference numerals, with the addition of a prime ('). According to this embodiment, the auxiliary shaft 2' is of hollow construction and is carried, through bearings 11, on a rigid non-rotating spindle 2a which is a part of a block 3' supported by the resilient plate 4', the ends whereof are secured to a rigid post or stand 12 connected to the machine bed.

The plate 4' is passed through the block 3' such that its centerplane contains the rotation axis; instead of a single throughgoing plate 4', two identical plates attached laterally to the block 3 of the stand, may be provided.

FIG. 5 illustrates a special advantage afforded by this embodiment, residing in that the drive pulley may be made integral with the auxiliary shaft 2.

I claim:

1. A machine for simultaneously detecting static and dynamic unbalance of rotary bodies, comprising a rigid stand member, at least one carrying member in the form of a resiliently flexible plate having at least one end thereof fixed to said stand member and a longitudinal axis extending transverse to said stand, a rotation shaft for mounting thereon a body to be balanced, a supporting structure rigid with said plate and arranged at a distance from said one end of said plate, said supporting structure having formations for rotatively accommodating said shaft with an axis of rotation for said shaft parallel to said plate, thereby a static unbalance of said rotary body causing in use mainly resilient lateral bending of said plate and a dynamic unbalance of said rotary body causing in use mainly twisting of said plate about its longitudinal axis, first detector means for detecting vibrations generated by the static unbalance of said body mainly in the direction transverse to said plate and second detector means for detecting vibrations generated by said dynamic unbalance mainly in a rotatory direction about said longitudinal axis of said plate and driving means for imparting rotation to said shaft.

2. A machine according to claim 1, wherein said rotation shaft is of hollow construction, and said rotative accommodation formations comprise a spindle extending into the interior of said hollow construction and fixed on said plate and having bearings whereon said hollow shaft is fitted for rotation.

3. A machine according to claim 1, wherein said axis of rotation extends in the same plane as said plate.

4. A machine according to claim 1, wherein said plate has a free end and said rotative accommodation formations are secured to said free end of the resilient plate.

5. A machine according to claim 1, wherein said plate has both ends thereof fixed to said stand member and wherein said supporting structure is arranged in an intermediate position between said fixed ends of said plate.

6. A machine according to claim 1, comprising two said plates arranged coplanar to each other, each having one end thereof fixed to said stand member at opposite locations with respect to each other and having the other end thereof secured to said supporting structure.

7. A machine according to claim 1, wherein said first and said second detector means comprise a common art rigid with said plate and extending transverse therefrom and having a free extremity thereof, said first detector means including a first transducer arranged in front of said free extremity of said arm thereby to sense lateral deflections of said plate and said second detector means including a second transducer arranged at the side of said free extremity of said arm thereby to sense torsional deflections of said plate.

8. A machine according to claim 1, wherein said first and said second transducers are of the piezoelectric type.

9. A machine according to claim 1, wherein said first and said second detector means include initial tension applying spring means constantly urging said detectors into their operative position and preventing movement away therefrom.

10. A balancing machine according to claim 1, characterized in that said first and said second detector means are mounted for non-separately sensing the bending or torsional deflections of said resilient plate but for sensing both torsional and bending deflection effects, the separation of the forces and moments induced by unbalance situations and acting on said transducers being accomplished through conventional electric circuits.

* * * * *